(12) United States Patent
Wang (10) Patent No.: US 9,777,718 B2
(45) Date of Patent: Oct. 3, 2017

(54) ELECTRICAL INFLATOR

(71) Applicant: Wei-Chi Wang, Tainan (TW)

(72) Inventor: Wei-Chi Wang, Tainan (TW)

( * ) Notice: Subject to any disclaimer, the term of this patent is extended or adjusted under 35 U.S.C. 154(b) by 327 days.

(21) Appl. No.: 14/578,374

(22) Filed: Dec. 20, 2014

(65) Prior Publication Data

US 2015/0322935 A1    Nov. 12, 2015

(30) Foreign Application Priority Data

May 8, 2014   (TW) .............................. 103208006 A (51) Int. Cl.
| | |
|---|---|
| *F04B 35/04* | (2006.01) |
| *F04B 37/10* | (2006.01) |
| *F04B 39/00* | (2006.01) |
| *F04B 39/12* | (2006.01) |
| *F21V 33/00* | (2006.01) |
| *F21V 23/04* | (2006.01) |
| *F21V 31/00* | (2006.01) |
| *F21V 3/02* | (2006.01) |
| *F21V 23/00* | (2015.01) |
| *F04B 33/00* | (2006.01) |
| *F21W 131/40* | (2006.01) |
| *B60S 5/04* | (2006.01) |
| *F21Y 115/10* | (2016.01) |

(52) U.S. Cl.
CPC ............. *F04B 35/04* (2013.01); *F04B 33/005* (2013.01); *F04B 37/10* (2013.01); *F04B 39/0016* (2013.01); *F04B 39/121* (2013.01); *F21V 3/02* (2013.01); *F21V 23/005* (2013.01); *F21V 23/006* (2013.01); *F21V 23/0414* (2013.01); *F21V 31/005* (2013.01); *F21V 33/00* (2013.01); *F21V 33/0084* (2013.01); *B60S 5/04* (2013.01); *F21W 2131/40* (2013.01); *F21Y 2115/10* (2016.08)

(58) Field of Classification Search
CPC ........ F04B 35/04; F04B 33/005; F04B 33/02; F04B 39/0016; F04B 39/121; F04B 37/10; F21V 33/00; F21V 33/0084; F21V 3/02; F21V 23/005; F21V 23/0414; F21V 31/05; F21Y 2101/00; F21W 2131/40; B60S 5/04

See application file for complete search history.

(56) References Cited

U.S. PATENT DOCUMENTS

| | | | | |
|---|---|---|---|---|
| 4,776,766 A | * | 10/1988 | Brent ...................... | F04B 33/00 137/224 |
| 5,127,808 A | * | 7/1992 | Nichols ................... | B62J 11/00 417/234 |

(Continued)

*Primary Examiner* — Charles Freay
(74) *Attorney, Agent, or Firm* — Tracy M. Heims; Apex Juris, Pllc (57) ABSTRACT

An electrical inflator has a cylindrical shell, an electrical aeration pump, an illumination assembly, a cell base and a switch assembly. The cylindrical shell has a tube, a front cover and a rear cover. The electrical aeration pump is mounted in the tube near the front cover and has a gas outlet located in the tube. The illumination assembly is mounted in the tube towards the front cover. The cell base is mounted in the tube behind the electrical aeration pump. The cell base has at least one cell. The switch assembly is mounted in the tube and electrically connects to the cell base, the electrical aeration pump and the illumination assembly.

20 Claims, 8 Drawing Sheets

(56) References Cited

U.S. PATENT DOCUMENTS

| | | | | |
|---|---|---|---|---|
| 5,509,576 | A * | 4/1996 | Weinheimer | B63C 9/24 222/192 |
| 6,439,104 | B1 * | 8/2002 | Tonogai | F04B 35/01 74/29 |
| 2008/0038119 | A1 * | 2/2008 | Kan | F04B 33/005 417/63 |
| 2008/0199324 | A1 * | 8/2008 | Yang | F04B 17/06 417/234 |
| 2011/0252959 | A1 * | 10/2011 | Huang | F04B 33/005 92/58.1 |

\* cited by examiner

ELECTRICAL INFLATOR

BACKGROUND OF THE INVENTION

1. Field of the Invention

The present invention relates to an electrical inflator, and more especially to an electrical inflator that has multiple functions of illumination and electrical inflation.

2. Description of the Prior Arts

In order to meet the requirement of lightweight and portability, manufacturers have always tried to minimize the volume of a conventional manual inflator. However, due to the reduced volume of the conventional manual inflator, the conventional manual inflator is difficult to be held by users and the users have to spend lots of time and physical efforts on inflating the tires of a bicycle. Furthermore, the conventional manual inflator does not have the function of illumination, so the conventional manual inflator is difficult to connect an air nozzle of the tire at night or at a dusky place. That causes many inconveniences using the conventional manual inflator.

To overcome the shortcomings, the present invention provides an electrical inflator to mitigate or obviate the aforementioned problems.

SUMMARY OF THE INVENTION

The main objective of the present invention is to provide an electrical inflator that can solve the inconveniences of the conventional manual inflator.

The electrical inflator has a cylindrical shell, an electrical aeration pump, an illumination assembly, a cell base and a switch assembly. The cylindrical shell has a tube, a front cover and a rear cover. The tube is hollow and has a front end, a rear end and a mounting space. The front cover is mounted in the front end of the tube, and the front cover has a through hole formed through the front cover. The rear cover is mounted in the rear end of the tube. The electrical aeration pump is mounted in the mounting space near the front cover and has a gas outlet located in the tube and corresponding to the through hole of the front cover. The illumination assembly is mounted in the mounting space of the tube near the front cover and emits light towards the through hole of the front cover. The cell base is mounted in the mounting space of the tube behind the electrical aeration pump. The cell base has at least one cell mounted in the cell base. The switch assembly is mounted in the mounting space of the tube behind the cell base and connects electrically to the cell base, the electrical aeration pump and the illumination assembly.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
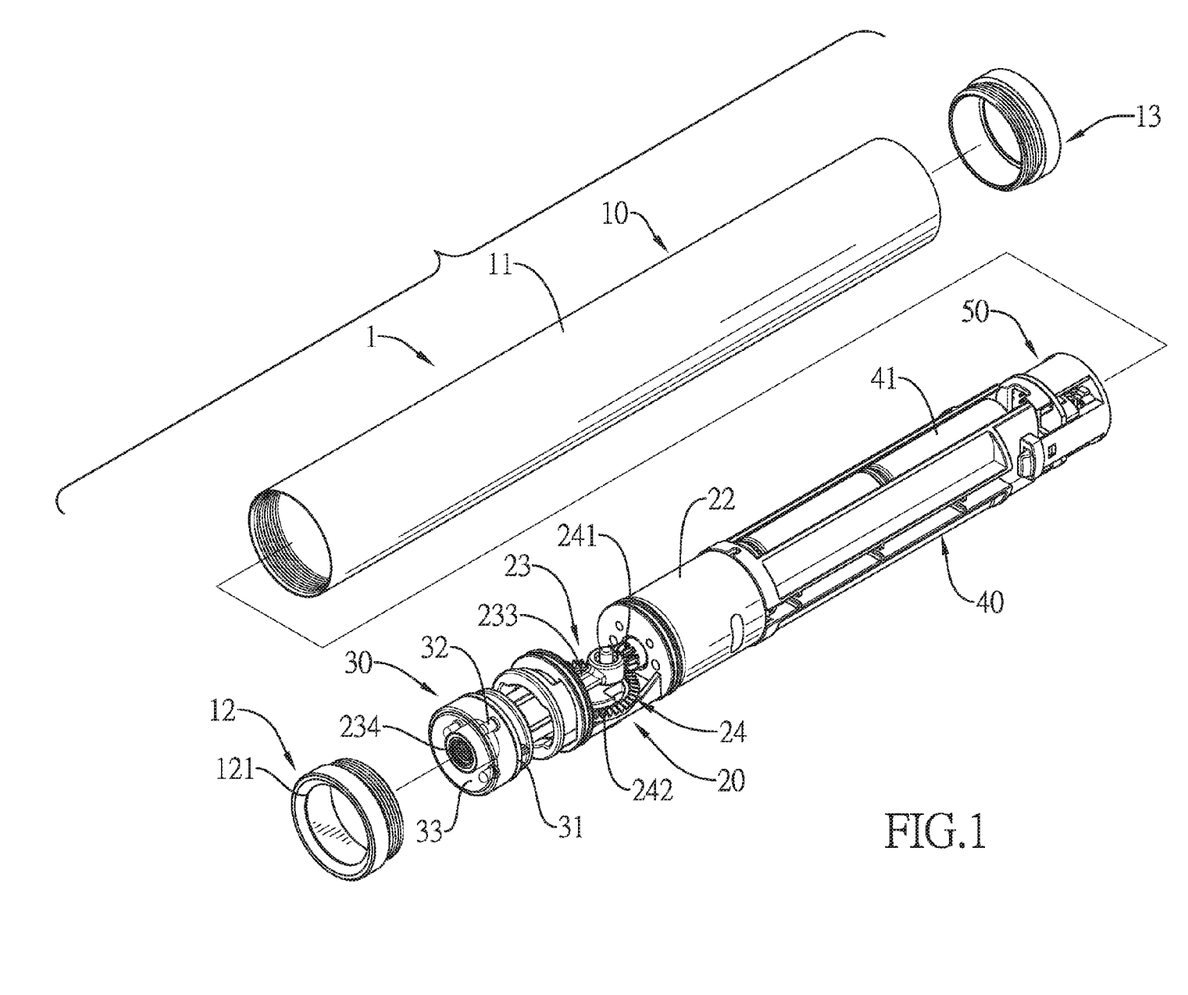
FIG. 1 is an exploded perspective view of an electrical inflator in accordance with the present invention.
Figure 2:
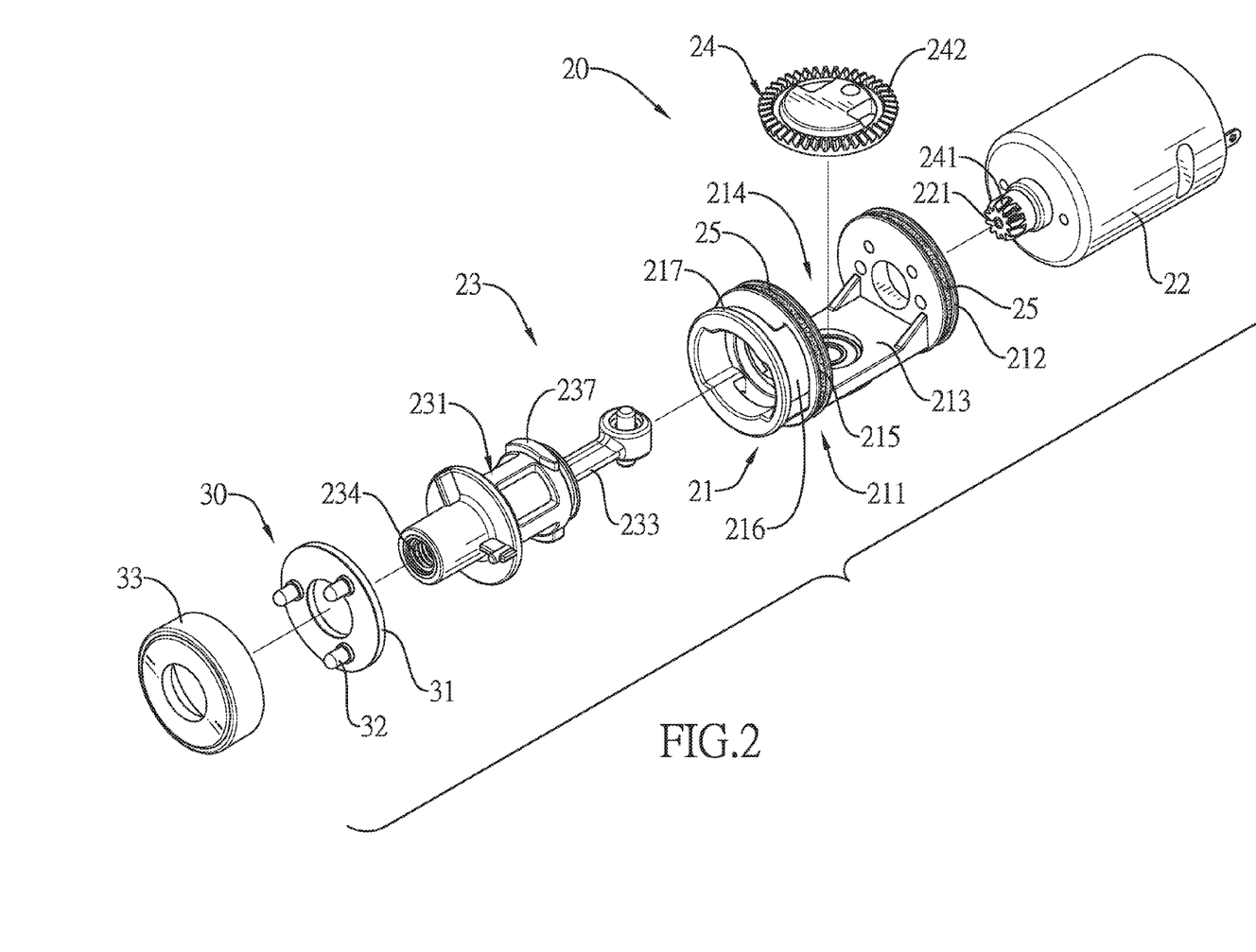
FIG. 2 is an enlarged and exploded perspective view of an electrical aeration pump and an illumination assembly of the electrical inflator in FIG. 1.

With reference to FIGS. 1 and 2, an electrical inflator 1 in accordance with the present invention includes a cylindrical shell 10, an electrical aeration pump 20, an illumination assembly 30, a cell base 40 and a switch assembly 50. The electrical aeration pump 20, the illumination assembly 30, the cell base 40 and the switch assembly 50 are mounted in the cylindrical shell 10 and align with an axis of the cylindrical shell 10.

With reference to FIG. 1, the cylindrical shell 10 has a tube 11, a front cover 12 and a rear cover 13. The tube 11 is hollow and has a front end, a rear end and a mounting space 111. The mounting space 111 is formed through the front end and the rear end of the tube 11. The front cover 12 is mounted in the front end of the tube 11 and the rear cover 13 is mounted in the rear end of the tube 11. In a preferred embodiment of the present invention, the tube 11 has two screwing portions respectively formed in the front end and the rear end of the tube 11. The front cover 12 has an external thread formed on an outer surface of the front cover 12, and the rear cover 13 has an external thread formed on an outer surface of the rear cover 13. The external threads of the front cover 12 and the rear cover 13 are respectively screwed with the screwing portions of the tube 11. The front cover 12 has a through hole 121 formed through the front cover 12.

Figure 3:
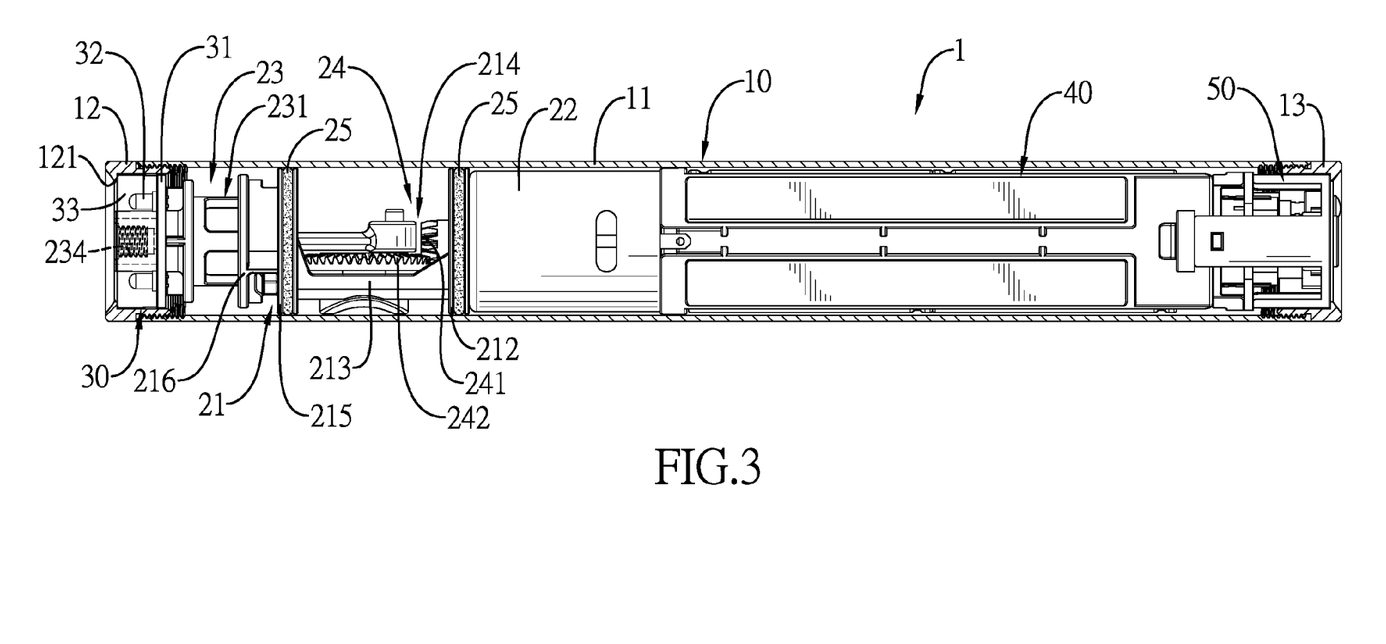
FIG. 3 is a partial cross-sectional side view of the electrical inflator in FIG. 1.

With reference to FIGS. 1 to 3, the electrical aeration pump 20 is mounted in the mounting space 111 of the tube 11 and has a positioning base 21, an electrical motor 22, a piston assembly 23 and a gear mechanism 24.

With reference to FIGS. 1 to 3, the positioning base 21 has two sides, a front base body 211, a rear base body 212, a connecting portion 213, a moving space 214, a front plate 215, a ring portion 216 and a joint portion 217. The front base body 211 and the rear base body 212 are respectively mounted on the sides of the positioning base 21. The connecting portion 213 is connected to the front base body 211 and the rear base body 212. The moving space 214 is formed in the positioning base 21 between the front base body 211 and the rear base body 212. The front plate 215 is formed around the front base body 211 and has a middle hole formed through the front plate 215. The ring portion 216 is formed on a front side of the front plate 215 and has a space communicating with the middle hole of the front plate 215. The joint portion 217 is mounted in the space of the ring portion 216.

Figure 4:
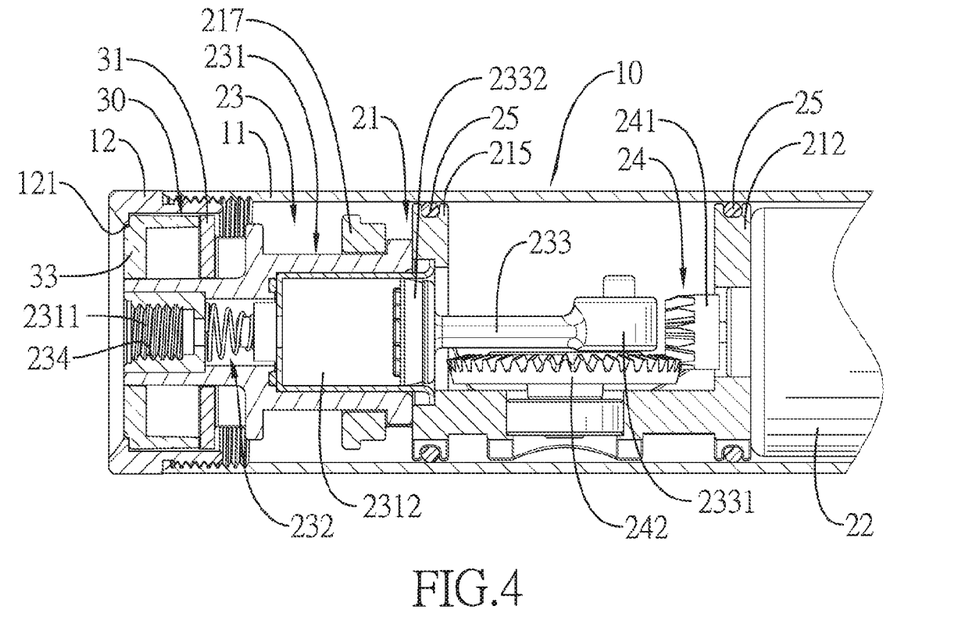
FIG. 4 is an enlarged partial cross-sectional side view of the electrical inflator in FIG. 3.

With reference to FIGS. 2 to 4, the electrical motor 22 is mounted on a rear end of the rear base body 212 of the positioning base 21 and has a rotatable spindle 221. The piston assembly 23 has a piston tube 231, a gas valve 232, an engagement portion 237 and a piston rod 233. The piston tube 231 has a chamber 2312. The chamber 2312 of the piston tube 231 has a front end, a rear end, a gas outlet 234 formed in the front end of the chamber 2312 of the piston tube 231, and an opening formed in the rear end of the chamber 2312 of the piston tube 231. The gas valve 232 is mounted in the piston tube 231 and communicates with the gas outlet 234. The gas valve 232 is used to control the flowing direction of the gas from the piston tube 231 to the gas outlet 234. The piston tube 231 has a thread portion 2311 formed on an inner surface of the gas outlet 234. The engagement portion 235 is formed on an outer surface of the piston tube 231. The piston tube 231 is mounted in the ring portion 216 of the positioning base 21, and the engagement portion 235 engages with the joint portion 217 to hold the piston tube 231 with the positioning base 21.

The piston rod 233 is movably mounted in and extends out of the piston tube 231 and has a pivoting end 2331 and a piston 2332. The pivoting end 2331 passes through the opening of the chamber 2312 of the piston tube 231 and the middle hole of the front plate 215, and is movably mounted in the moving space 214 of the positioning base 21. The piston rod 233 has a front end mounted in the chamber 2312 of the piston tube 231. The piston 2332 is mounted on the front end of the piston rod 233 and is movably mounted in the chamber 2312 of the piston tube 231.

With reference to FIGS. 2 to 4, the gear mechanism 24 is mounted in the moving space 214 of the positioning base 21 and is connected to the electrical motor 22 and the piston rod 233. The gear mechanism 24 has an active gear 241 and a passive gear 242, and both the active gear 241 and the passive gear 242 are bevel gears. The active gear 241 is connected to the rotatable spindle 221 of the electrical motor 22 and is mounted in the moving space 214 of the positioning base 21. The passive gear 242 is mounted pivotally on the connecting portion 213 and engages vertically with the active gear 241. The pivoting end 2331 of the piston rod 233 is mounted pivotally and eccentrically on the passive gear 242. So the electrical motor 22 can drive the piston rod 233 to move alternately backwards and forwards relative to the piston tube 231 by the gear mechanism 24 to enable the electrical aeration pump 20 to have an inflating function.

With reference to FIGS. 2 to 4, in the preferred embodiment of the present invention, and the positioning base 21 further has two circular grooves and two resilient rings 25. The circular grooves are formed respectively on peripheries of the front plate 215 of the front base body 211 and the rear base body 212. The resilient rings 25 are respectively mounted in the circular grooves. The resilient rings 25 abut on an inner surface of the cylindrical shell 10 to prevent the positioning base 21 from contacting the cylindrical shell 10. This would reduce the noises when the electrical aeration pump 20 is working.

With reference to FIGS. 2 and 3, the illumination assembly 30 has a circuit board 31 and at least one light-emitting diode 32 (LED). The at least one light-emitting diode 32 is electrically connected to the circuit board 31. In the preferred embodiment of the present invention, the circuit board 31 has a central hole formed through the circuit board 31 and multiple light-emitting diodes 32 are mounted on the circuit board 31 around the central hole of the circuit board 31. The central hole of the circuit board 31 is mounted around the front end of the piston assembly 23 that has the gas valve 232. An emitting direction of the light-emitting diodes 32 is towards the through hole 121 of the front cover 12. With reference to FIG. 4, the illumination assembly 30 further has a lamp shade 33, and the lamp shade 33 is mounted around the circuit board 31 and covers the light-emitting diodes 32.

With reference to FIGS. 1 to 3, the cell base 40 is mounted in the mounting space 111 of the tube 11 behind the electrical motor 22 of the electrical aeration pump 20. The cell base 40 has at least one cell 41 mounted in the cell base 40. The at least one cell 41 may be a dry cell or a rechargeable cell.

Figure 5:
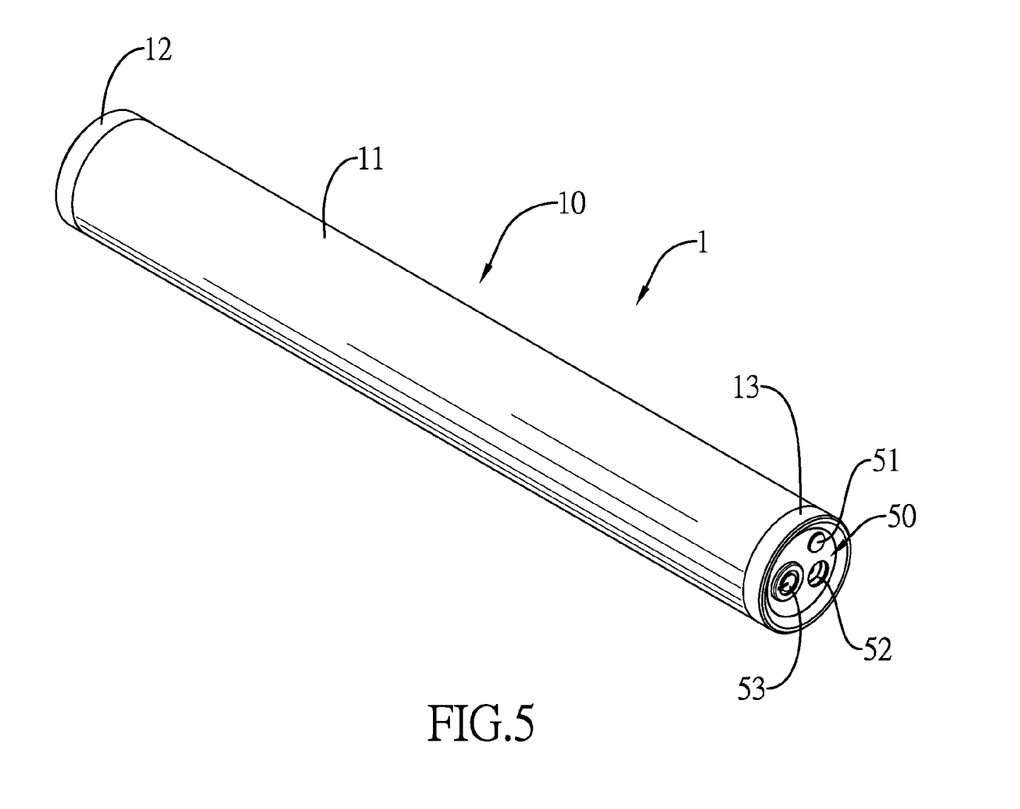
FIG. 5 is a rear perspective view of the electrical inflator in FIG. 1.

With reference to FIGS. 1, 3 and 5, the switch assembly 50 is mounted in the mounting space 111 of the tube 11 behind the cell base 40 and is connected electrically to the cell base 40, the electrical motor 22 of the electrical aeration pump 20, and the illumination assembly 30. The switch assembly 50 has a pump switch 53, a lighting switch 51 and a charging adapter 52. The pump switch 53, the lighting switch 51 and the charging adapter 52 extend out of the rear cover 13 of the cylindrical shell 10. The pump switch 53 is connected electrically to the electrical motor 22 and the cell base 40, and the lighting switch 51 is connected electrically to the circuit board 31 of the illumination assembly 30 and the cell base 40. The charging adapter 52 is connected electrically to the cell base 40 for charging the rechargeable cell in the cell base 40.

Figure 6:
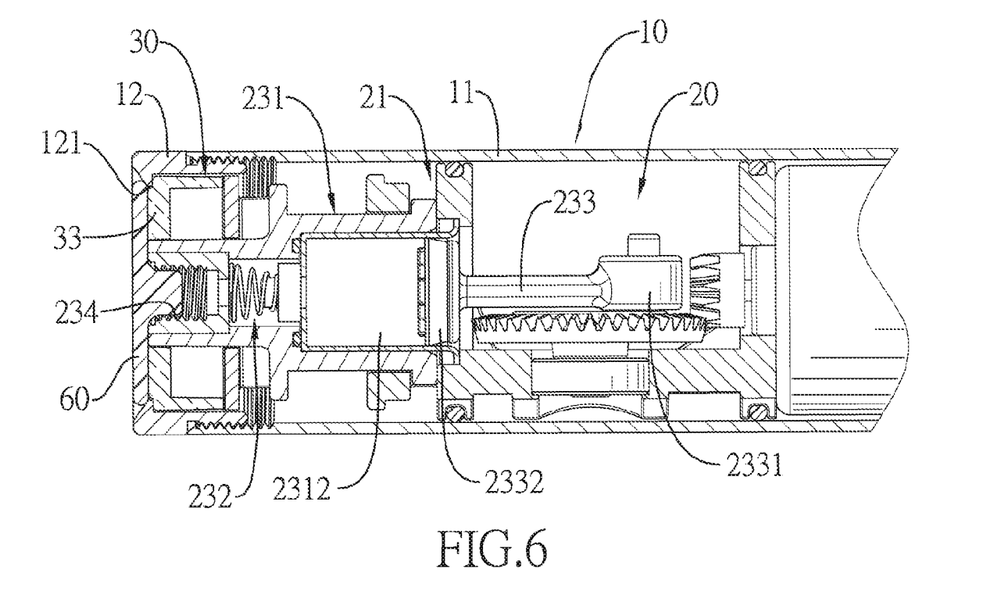
FIG. 6 is another partial cross-sectional side view of the electrical inflator in FIG. 1, shown with a water proof cover.
Figure 7:
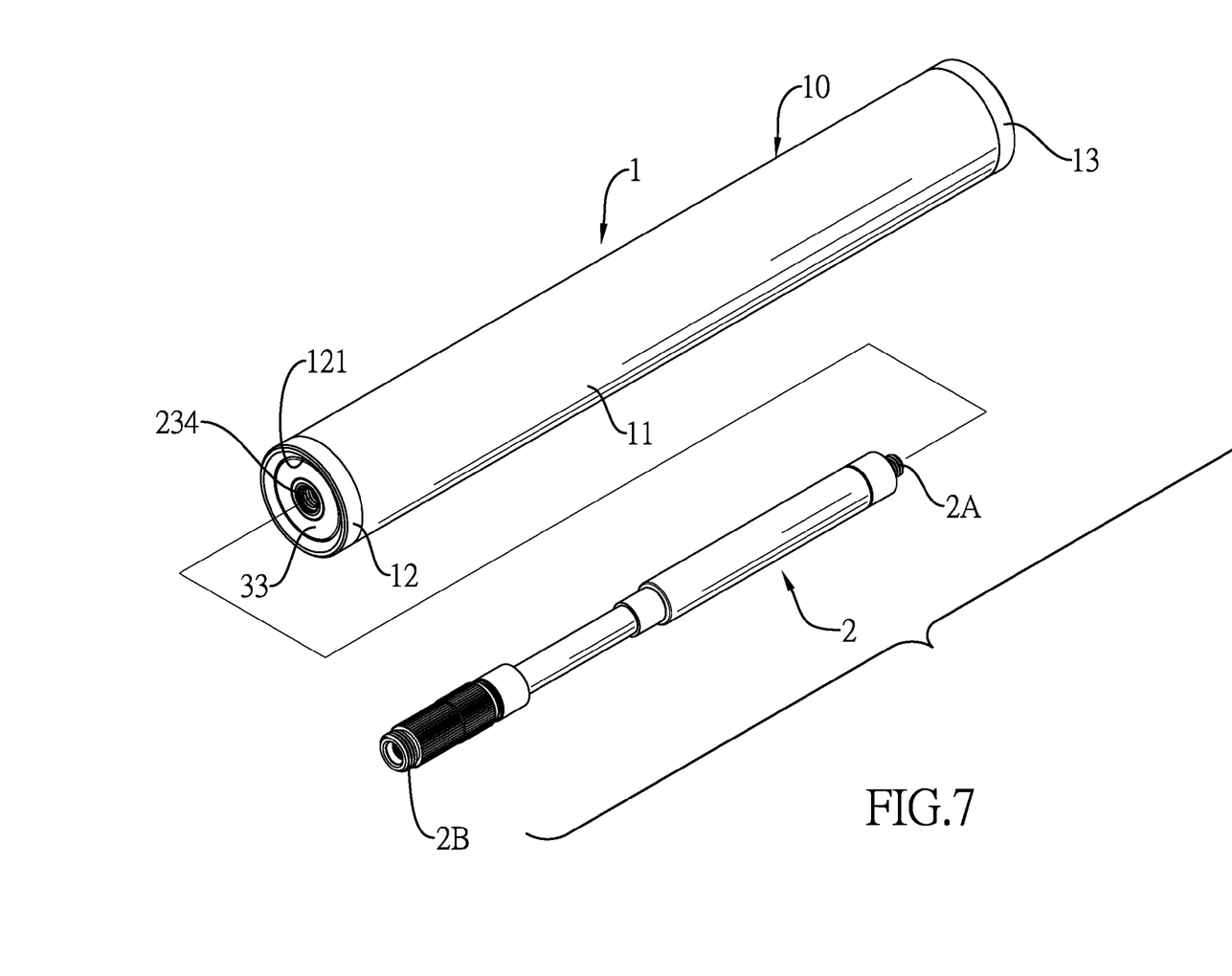
FIG. 7 is an operational perspective view of the electrical inflator in FIG. 1, shown connected to a flexible connecting pipe.

With reference to FIG. 6, the electrical inflator 1 of the present invention has a waterproof cover 60 mounted in the front cover 12 of the cylindrical shell 10, so the through hole 121 and the gas outlet 234 are sealed by the waterproof cover 60. The water proof cover 60 is made of rubber.

With reference to FIGS. 3, 7, 8 and 9, when the electrical inflator 1 of the present invention is intended to inflate the tires of a bicycle, a flexible connecting pipe 2 or a separable air faucet can be connected to the electrical inflator 1 of the present invention for connecting to a gas nozzle of the tire. The flexible connecting pipe 2 has an inflating joint 2A and a gas joint 2B. The inflating joint 2A and the gas joint 2B are respectively mounted on two opposite ends of the flexible connecting pipe 2. The inflating joint 2A is mounted in the front cover 12 of the cylindrical shell 10 and communicates with the gas outlet 234. The gas joint 2B communicates with the inflating joint 2A and is used to connect to a gas nozzle of the tires. The inflating joint 2A has an external thread that is screwed with thread portion 2311 of the gas valve 232. With reference to FIGS. 4 and 6, the electrical motor 22 of the electrical aeration pump 20 is driven by turning on the pump switch 53 of the switch assembly 50. So the electrical motor 22 can drive the piston rod 233 to move alternately backwards and forwards relative to the piston tube 231 by the gear mechanism 24 and the forced gases flow through the flexible pipe 2 to inflate the tires. After inflating the tires, the pump switch 53 is turned off and the flexible pipe 2 is removed from the tires.

Figures 8, 9:
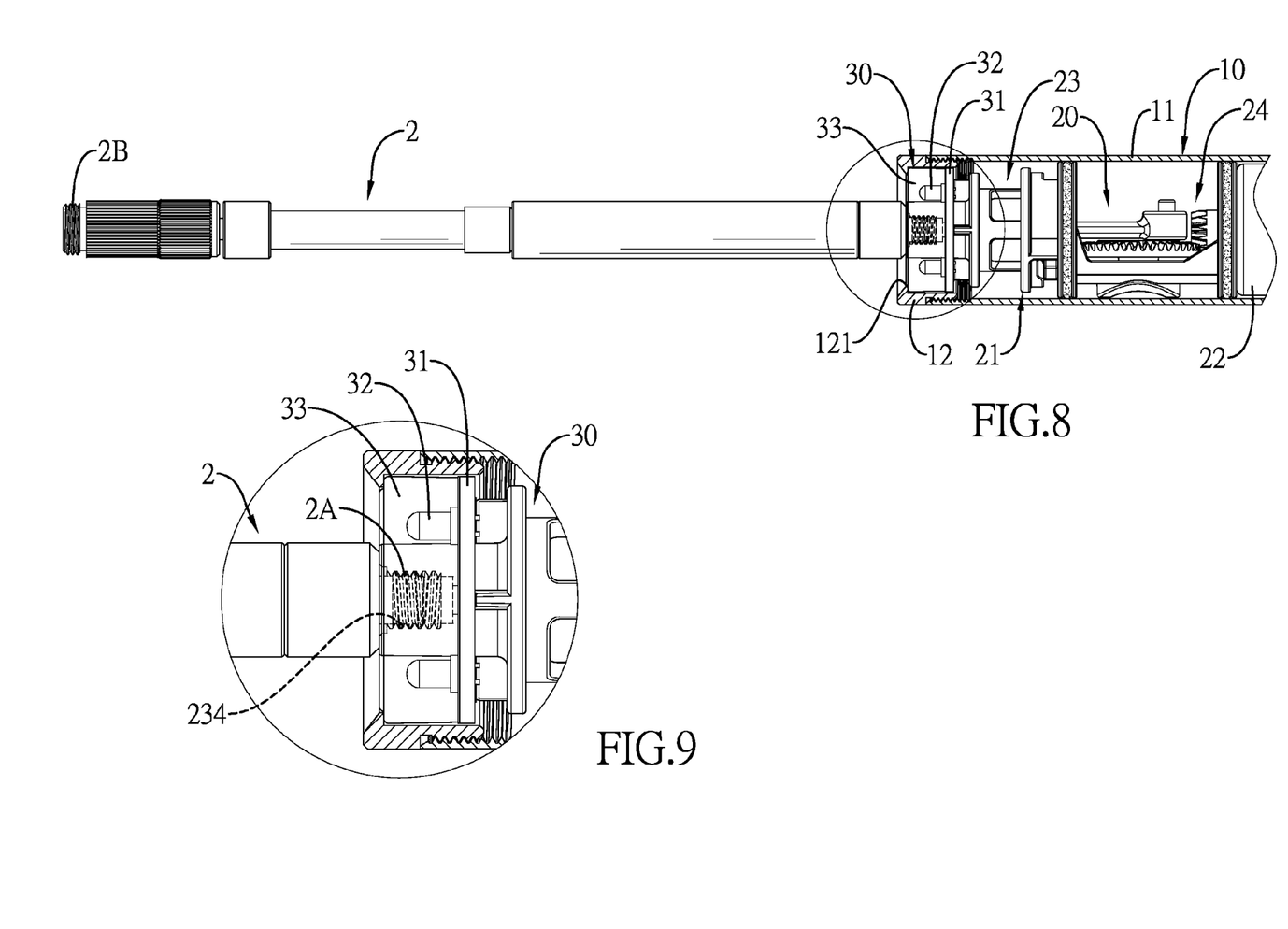
FIG. 8 is an operational partial cross-sectional side view of the electrical inflator in FIG. 7, shown connected to the flexible connecting pipe.
FIG. 9 is an enlarged and operational partial cross-sectional side view of the electrical inflator in FIG. 8.

With reference to FIGS. 8 and 9, when inflating tires at night or at a dusky place, users can turn on the lighting switch 51 to light up the illumination assembly 30. So the light emitted by the light-emitting diodes 32 can illuminate the gas nozzle of the tires. Then, the users can easily connect the flexible pipe 2 to the gas nozzle of the tires. Therefore, the electrical inflator 1 of the present invention has a function of illumination and can be used as a flashlight.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electrical inflator comprising:
   a cylindrical shell having
      a tube being hollow and having
         a front end, a rear end and a mounting space formed through the front end and the rear end of the tube;
      a front cover mounted in the front end of the tube and having a through hole formed through the front cover; and
      a rear cover mounted in the rear end of the tube;
   an electrical aeration pump mounted in the mounting space near the front cover and having a gas outlet located in the tube and corresponding to the through hole of the front cover;
   an illumination assembly mounted in the mounting space of the tube near the front cover and emitting light towards the through hole of the front cover;
   a cell base mounted in the mounting space of the tube behind the electrical aeration pump and having at least one cell mounted in the cell base; and
   a switch assembly mounted in the mounting space of the tube behind the cell base and connecting electrically to the cell base, the electrical aeration pump, and the illumination assembly.

2. The electrical inflator as claimed in claim 1, wherein the electrical aeration pump has
   a positioning base having
      a front base body mounted on a side of the positioning base;
      a rear base body mounted on another side of the positioning base;
      a connecting portion connected to the front base body and the rear base body; and
      a moving space formed in the positioning base between the front base body and the rear base body;
   an electrical motor mounted behind the rear base body of the positioning base and having a rotatable spindle;
   a piston assembly having
      a piston tube having
         a chamber with a front end and a rear end;
      wherein the gas outlet of the electrical aeration pump is formed in the front end of the chamber of the piston tube;
      a gas valve mounted in the piston tube and communicating with the gas outlet; and
      a piston rod movably mounted through the piston tube, located in the moving space of the positioning base, and having
         a front end mounted in the chamber of the piston tube; and
         a piston mounted on the front end of the piston rod and movably mounted in the chamber of the piston tube; and
   a gear mechanism mounted in the moving space of the positioning base and connecting to the electrical motor and the piston rod.

3. The electrical inflator as claimed in claim 2, wherein the positioning base has two resilient rings;
   the front base body of the positioning base has a circular groove formed on a periphery of the front base body, and one of the resilient rings is mounted in the circular groove;
   the rear base body of the positioning base has a circular groove formed on a periphery of the rear base body, and the other resilient ring is mounted in the circular groove of the rear base body; and
   the resilient rings abut on an inner surface of the cylindrical shell.

4. The electrical inflator as claimed in claim 2, wherein the positioning base has
   a front plate formed around the front base body and having a middle hole formed through the front plate;
   a ring portion formed on a front side of the front plate and having
      a space communicating with the middle hole of the front plate;
   a joint portion mounted in the space of the ring portion;
   the piston tube has a thread portion formed on an inner surface of the gas outlet;
   the piston assembly has an engagement portion formed on an outer surface of the piston tube;
      the piston tube is mounted in the ring portion of the positioning base and the engagement portion is engaged with the joint portion to hold the piston tube with the positioning base; and
      the piston rod has a pivoting end passing through the middle hole of the front plate;
   the gear mechanism has
      an active gear connected to the rotatable spindle of the electrical motor and is located in the moving space of the positioning base; and
      a passive gear mounted pivotally on the connecting portion and engaging vertically with the active gear, the pivoting end of the piston rod mounted pivotally and eccentrically on the passive gear.

5. The electrical inflator as claimed in claim 4, wherein the positioning base has two resilient rings;
   the front base body of the positioning base has a circular groove formed on a periphery of the front base body, and one of the resilient rings is mounted in the circular groove;
   the rear base body of the positioning base has a circular groove formed on a periphery of the rear base body, and the other resilient ring is mounted in the circular groove of the rear base body; and
   the resilient rings abut on an inner surface of the cylindrical shell.

6. The electrical inflator as claimed in claim 2, wherein the illumination assembly has
   a circuit board having
      a central hole formed through the circuit board and mounted around the gas valve of the piston assembly;
   at least one light-emitting diode electrically connected to the circuit board; and
   a lamp shade mounted on the circuit board and covering the at least light-emitting diode.

7. The electrical inflator as claimed in claim 3, wherein the illumination assembly has
   a circuit board having a central hole formed through the circuit board and mounted around the gas valve of the piston assembly;
   at least one light-emitting diode electrically connected to the circuit board; and
   a lamp shade mounted on the circuit board and covering the at least light-emitting diode.

8. The electrical inflator as claimed in claim 4, wherein the illumination assembly has
   a circuit board having a central hole formed through the circuit board and mounted around the gas valve of the piston assembly;
   at least one light-emitting diode electrically connected to the circuit board; and a lamp shade mounted on the circuit board and covered the at least light-emitting diode.

9. The electrical inflator as claimed in claim 5, wherein the illumination assembly has
   a circuit board having a central hole formed through the circuit board and mounted around the gas valve of the piston assembly;
   at least one light-emitting diode electrically connected to the circuit board; and
   a lamp shade mounted on the circuit board and covered the at least light-emitting diode.

10. The electrical inflator as claimed in claim 6, wherein the switch assembly has a pump switch and a lighting switch extending out of the rear cover of the cylindrical shell, the pump switch connected electrically to the electrical motor and the cell base, and the lighting switch connected electrically to the circuit board of the illumination assembly and the cell base.

11. The electrical inflator as claimed in claim 7, wherein the switch assembly has a pump switch and a lighting switch extending out of the rear cover of the cylindrical shell, the pump switch connected electrically to the electrical motor and the cell base, and the lighting switch connected electrically to the circuit board of the illumination assembly and the cell base.

12. The electrical inflator as claimed in claim 8, wherein the switch assembly has a pump switch and a lighting switch extending out of the rear cover of the cylindrical shell, the pump switch connected electrically to the electrical motor and the cell base, and the lighting switch connected electrically to the circuit board of the illumination assembly and the cell base.

13. The electrical inflator as claimed in claim 9, wherein the switch assembly has a pump switch and a lighting switch extending out of the rear cover of the cylindrical shell, the pump switch connected electrically to the electrical motor and the cell base, and the lighting switch connected electrically to the circuit board of the illumination assembly and the cell base.

14. The electrical inflator as claimed in claim 10, wherein the switch assembly has a charging adapter connected electrically to the cell base.

15. The electrical inflator as claimed in claim 11, wherein the switch assembly has a charging adapter connected electrically to the cell base.

16. The electrical inflator as claimed in claim 12, wherein the switch assembly has a charging adapter connected electrically to the cell base.

17. The electrical inflator as claimed in claim 13, wherein the switch assembly has a charging adapter connected electrically to the cell base.

18. The electrical inflator as claimed in claim 14, wherein the electrical inflator has a waterproof cover mounted in the front cover of the cylindrical shell and sealing the through hole and the gas outlet.

19. The electrical inflator as claimed in claim 15, wherein the electrical inflator has a waterproof cover mounted in the front cover of the cylindrical shell and sealing the through hole and the gas outlet.

20. The electrical inflator as claimed in claim 16, wherein the electrical inflator has a waterproof cover mounted in the front cover of the cylindrical shell and sealing the through hole and the gas outlet.

* * * * *